June 26, 1923.
R. SIEGFRIED
1,460,181
RESILIENT COUPLING
Filed Dec. 10, 1919
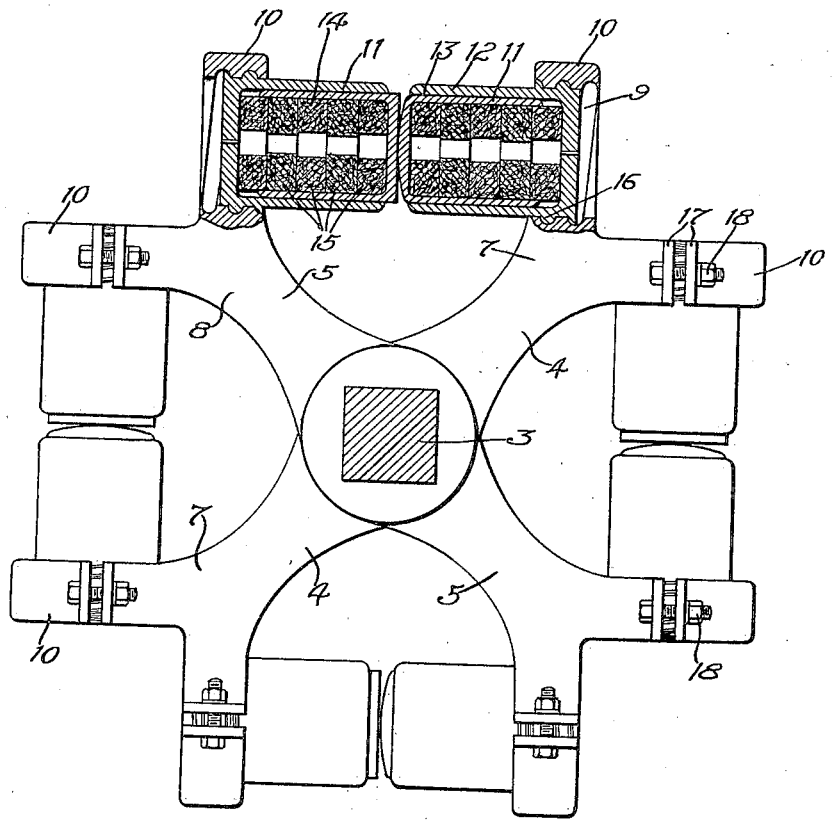
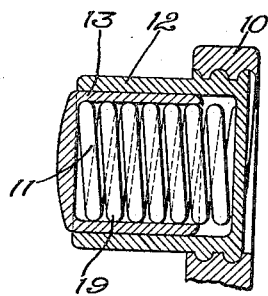
WITNESSES:
J. B. Merrill
F. A. Lind.
INVENTOR
Robert Siegfried
BY
Wesley G. Carr
ATTORNEY Patented June 26, 1923.

UNITED STATES PATENT OFFICE.

1,460,181

ROBERT SIEGFRIED, OF PITTSBURGH, PENNSYLVANIA, ASSIGNOR TO WESTINGHOUSE ELECTRIC & MANUFACTURING COMPANY, A CORPORATION OF PENNSYLVANIA.

RESILIENT COUPLING.

Application filed December 10, 1919. Serial No. 343,898.

*To all whom it may concern:*

Be it known that I, ROBERT SIEGFRIED, a citizen of the United States, and a resident of Pittsburgh, in the county of Allegheny and State of Pennsylvania, have invented a new and useful Improvement in Resilient Couplings, of which the following is a specification.

My invention relates to flexible couplings for use in the operation of large power machines requiring intermittent application of power, and it has particular relation to shock-absorbing devices therefor and the method of mounting the same.

The object of my invention is to provide apparatus of the character designated that shall permit relative longitudinal movement of the two coupling members, that shall transmit rotative motion without any backlash, that shall be adapted to withstand great strains, that shall have exceptionally good wearing qualities, that shall be simple and inexpensive to manufacture, and that shall permit relative adjustment of the shock-absorbing devices with respect to the main body portions of the coupling members.

In the accompanying drawings, Figure 1 is a view, partially in elevation and partially in section, illustrating one form of my invention, and Fig. 2 is a detail sectional view of a shock-absorbing member illustrating a second form thereof.

Heretofore, trouble has been experienced in providing a flexble coupling member that would permit longitudinal movement of one of the coupling members with respect to their common axis without transmitting this movement to the other coupling member. By my invention, I provide a flexible coupling which eliminates this trouble and which protects the flexible member from injury from agencies foreign to the proper operation of the coupling.

For a better understanding of my invention, reference may now be had to the accompanying drawings in which I show a shaft 3 provided with a coupling member 4, and a similar coupling member 5 attached to a second shaft, (not shown). Each of the coupling members 4 and 5 is provided with two diametrically opposite, radially-extending arms 7—7 and 8—8, respectively. At the ends of each of the arms 7 and 8 are provided threaded seats 9 in ring members 10, integral with the arms 7 and 8, for two shock-absorbing members 11. Each of the shock-absorbing members 11 comprises an outer casing 12 of substantially cup-shape and a similarly shaped member 13, oppositely disposed with respect to the member 12, and partially enclosed therein. The members 12 are so fitted as to have a sliding contact with the members 13. Inside the cup 13 and in engagement with the end portion of the cup 12 is a resilient device 14. In one form of my invention, this resilient device consists of a plurality of disks 15 composed of fiber, wood, or other suitable resilient material. The outer cup-shape members 11 are provided with threads 16 engaging the threaded seats 9. By reason of this threaded engagement, the position of the shock-absorbing members with respect to their supports 10 are rendered adjustable. The ring members 10 are split on one side and are provided with lugs 17 adjacent the edges of the slot therein through which a bolt 18 extends. These bolts cause the ring members 10 to clampingly engage the members 12 after they have been adjusted with respect thereto. In another form of my invention, shown in Fig. 2 the disks 15 are substituted by a spring member 19.

From the foregoing description, it will be obvious that by providing two oppositely-disposed cup-shaped members, the resilient device is entirely enclosed therein and is thereby protected from shocks other than those for which it is designed, and also, from moisture, gas or other deleterious agencies. The end portion of the cup-shape member 13 also provides a much better wearing surface for the resilient members than would be possible if two resilient devices were permitted to be in engagement with each other. By reason of the fact that the two members are not connected but are merely in yielding engagement with each other, the members are free to move in a direction parallel to their shafts with respect to each other without in any way interfering with their correct operation. Also by means of the threaded adjustment of the shock-absorbing members with respect to their seats, these members may be so adjusted as to be continuously in engagement with each other, thus preventing the possibility of backlash when the wearing surfaces become worn.

While I have shown a plurality of forms of my invention and have described in detail one application of the same, it will be obvious to those skilled in the art that it is not so limited, but is susceptible of various minor changes and modifications without departing from the spirit thereof, and I desire, therefore, that only such limitations shall be placed thereon as are imposed by the prior art or are set forth in the appended claims.

I claim as my invention:

1. A flexible coupling comprising two members severally provided with lateral projections having opposing seats, and a shock-absorbing member mounted in each of said seats, independently of the other seats, and comprising a resiliently mounted member provided with a metallic wearing surface.

2. A flexible coupling comprising two members severally provided with lateral projections having opposing seats, and a shock-absorbing member mounted in each of said seats and comprising two oppositely-disposed, relatively movable members of substantially cup-shape.

3. A flexible coupling comprising two members severally provided with lateral projections having opposing seats, and a shock-absorbing member mounted in each of said seats comprising two oppositely disposed relatively movable substantially cup-shape members enclosing a resilient device.

4. A flexible coupling comprising two members severally provided with lateral projections having opposing seats, and a shock-absorbing member mounted in each of said seats and comprising a resilient device enclosed within two oppositely-disposed, relatively-movable substantially cup-shape members, one of said cup-shape members being partially enclosed within the other.

5. A flexible coupling comprising two members severally provided with lateral projections having opposing seats, and a shock-absorbing member mounted in each of said seats and comprising a substantially cup-shaped member rigidly attached to the seat, an oppositely disposed cup-shape member partially enclosed within first mentioned cup-shape member and a resilient device disposed within said cup-shape members.

6. A flexible coupling comprising two members severally provided with lateral projections having opposing seats, and a shock-absorbing member mounted in each of said seats and comprising a resiliently-mounted member provided with a metallic wearing surface, said wearing surface being adjustable with respect to said seat.

7. A flexible coupling comprising two members severally provided with lateral projections having opposing seats, and a shock-absorbing member mounted in each of said seats and comprising two oppositely-disposed, relatively movable, substantially cup-shape members enclosing a resilient device, said cup-shape members being adjustable with respect to said seat.

8. A flexible coupling comprising two members severally provided with lateral projections having opposing seats, and a shock-absorbing member mounted in each of said seats comprising a substantially cup-shape member rigidly adjustably attached to the seat, an oppositely-disposed cup-shape member partially enclosed within said first mentioned cup and a resilient device disposed within said cup-shape members.

9. A flexible coupling comprising two members severally provided with lateral projections having opposing seats, and a shock-absorbing member mounted in each of said seats comprising two oppositely-disposed relatively-movable substantially cup-shape members enclosing a resilient device, one of said cup-shape members being in threaded engagement with said seat.

In testimony whereof, I have hereunto subscribed my name this 3rd day of December 1919.

ROBERT SIEGFRIED.